Figure 1:
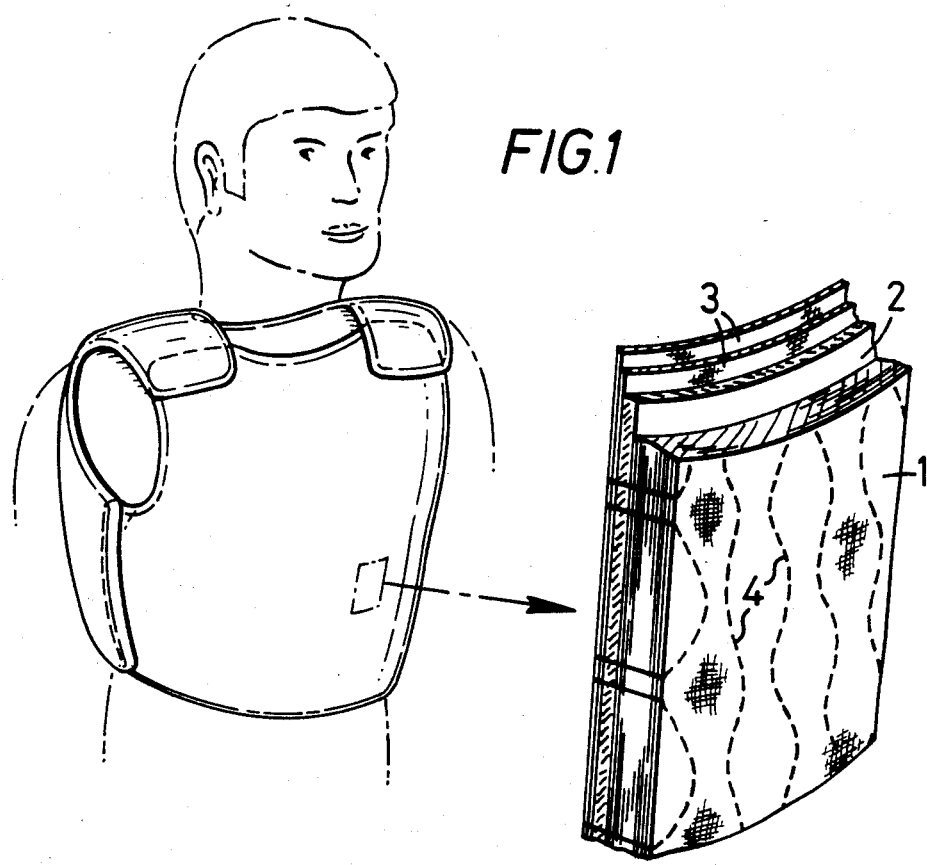

United States Patent [19]

Dunbavand

[11] Patent Number: 4,608,717
[45] Date of Patent: Sep. 2, 1986

[54] FLEXIBLE ARMOR

[75] Inventor: Ian E. Dunbavand, Bristol, England

[73] Assignee: Bristol Composite Materials Engineering Limited, Bristol, England

[21] Appl. No.: 628,298

[22] Filed: Jul. 6, 1984

[30] Foreign Application Priority Data

Jul. 6, 1983 [GB] United Kingdom .................. 8318315

[51] Int. Cl.⁴ .............................................. F41H 1/02
[52] U.S. Cl. ......................................... 2/2.5; 468/911
[58] Field of Search .............................. 2/2.5; 428/911

[56] References Cited

U.S. PATENT DOCUMENTS

| | | | |
|---|---|---|---|
| 3,320,619 | 5/1967 | Casonil et al. | 2/2.5 |
| 3,519,529 | 7/1970 | Cook | 2/2.5 |
| 3,582,988 | 6/1971 | Armellino | 2/2.5 |
| 3,641,638 | 2/1972 | Liable | 2/2.5 |
| 3,855,632 | 12/1974 | Davis | 2/2.5 |
| 3,971,072 | 7/1976 | Armellino | 2/2.5 |

*Primary Examiner*—Doris L. Troutman
*Attorney, Agent, or Firm*—Morgan, Finnegan, Pine, Foley & Lee

[57] ABSTRACT

A flexible protective armor has the form of a laminate having front and back layers of an aramid fibre fabric sandwiching a bag of packed feathers, foam, or felt material. The laminate is drawn tightly together by stitching or similar process. The armor may be further enhanced by integrating the laminate with a front shield of further layers of aramid fibres which are also stitched together.

6 Claims, 3 Drawing Figures

FLEXIBLE ARMOR

The present invention relates to protective clothing and more particularly relates to flexible clothing or armour for protecting persons against injury by a bullet or other missile.

Flexible protective clothing such as armour jackets is known but in general tends to be bulky and/or heavy. The present invention relates to improved protective clothing which is thinner and lighter than conventional protective clothing and yet has a similar protective ability.

Thus according to the present invention there is provided a flexible protective armour comprising a laminate having a front layer and a back layer of a fabric comprising aramid fibres and a further layer comprising trauma attenuation material sandwiched therebetween.

The front layer of the fabric refers to the layer which faces towards the direction of impact of a projectile.

The fabric comprising aramid fibres is preferably Kevlar (a registered trade mark) which is a synthetic fibre made from an aromatic polyamide. The aramid fibres have high tensile strength and rigidity and are effective in resisting the punch through of a bullet or projectile and preventing injury. The aramid fibres are generally woven into fabric but could be stitched or flexibly bonded.

The trauma attenuation preferably comprises feathers, foam or felt.

The sandwich layer of packed feathers, foam or felt has the effect of distributing the impact of the projectile over a large area and allowing gradual deceleration of the projectile thus reducing the trauma of the projectile impact.

The backing or inner layer of fabric comprising aramid fibres resists distortion or bulging of the protective clothing.

The layers of the laminate are preferably drawn together by stitching, punching, rivetting, bonding, or stapling. The front and back layers may comprise one or more sheets of an aramid fibre, the preferred aramid fibre being "Kevlar" (a registered trade mark). The stitching may be used to produce an armour which is curved in more than one direction so that it closely fits the body. In one embodiment of the invention, the flexible protective armour comprises front and back layers of an aramid fibre fabric having a bag of packed feathers or having felt sandwiched therebetween, the layers and bag or felt being tightly drawn together by stitching. Other low density strong material such as foam may be used for trauma attenuation.

The body armour may comprise a multi-layer system. The laminate or layers of laminates may have a surrounding cover.

By stitching the high strength aramid fibres and the low density shock or trauma absorbing layers (feathers) together with high strength thread in a sandwich form, the energy absorbing performance of the body armour is significantly improved.

In another embodiment of the invention, the flexible protective armour (as herein before described) has a separate armour pack positioned in front of it, the separate armour pack comprising one or more layers of an aramid fibre fabric such as "Kevlar" (a registered trade mark). This yields a heavier and more protective flexible armour than the equivalent one piece unit. The flexible protective armour and the separate armour pack may have a surrounding cover.

The invention will now be described by way of example only and with reference to FIGS. 1 and 2 of the accompanying drawings.

FIG. 1 shows a perspective view of a single flexible piece of protective clothing and FIG. 2 is a perspective view of a double flexible body amour comprising separate front and back units.

In FIG. 1, the clothing has a front or outer layer of Kevlar fibre 1, a sandwich layer 2 of feathers and a thinner back layer 3 of Kevlar fibre. The outer layer 1 comprises fourteen layers of D235 Kevlar aramid fibres, the back layer 3 has two layers of the same fibres and the sandwich layer 2 is a bag of feathers, foam, or felt.

The layers are drawn tightly together by stitching 4 to form an integral protective clothing unit as shown.

The Kevlar fabric is a synthetic, organic, ballistic fabric woven from Kevlar 29 and Kevlar 49 fibre and having a weight per layer in the range of 100 to 300 gram/meter$^2$. The fabric has a water repellent finish.

The density of the feathers in the bag is of the order 0.1 to 0.5 lbs/sq foot. The feathers are processed to alleviate deterioration with time and for maximum energy absorption.

As shown, the layers are stitched together as one unit. Conventional criss-cross stitching tends to produce a relatively stiff garment. It is found that "wavy" stitching is less time consuming and leads to a more flexible and close fitting body armour. Alternatively the layers may be drawn together by punching, rivetting, bonding, or stapling. The clothing may comprise one or more flexible units worn one above the other.

Figure 2A:
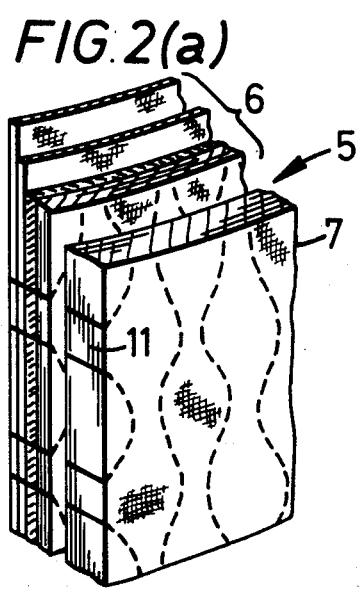
Figure 2B:
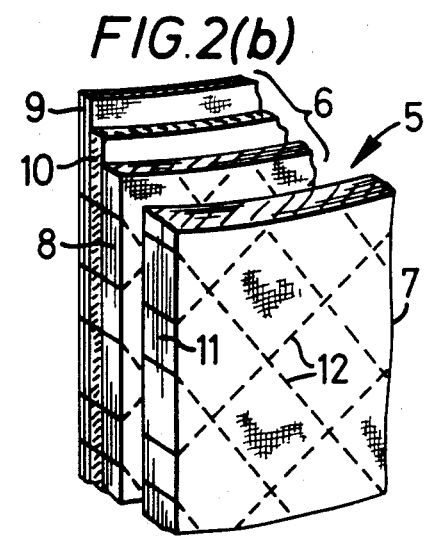

In FIG. 2(a), a further form of flexible protective armour is shown which is designed to be more effective against projectiles having higher penetration potential.

The armour 5 comprises two armour units 6, 7. The first unit 6 is as described above and takes the form of a front layer 8 and back layer 9 of "Kevlar" (a registered trade mark) aramid fibre fabric with a sandwich 10 of feathers between, the layers being tightly stitched together. The second unit 7 comprises a plurality of layers 11 of aramid fibre fabric which are also stitched together to give increased penetration resistance. The two units 6, 7 are stitched together around their periphery to form an integral unit. This arrangement yields an armour of increased penetration resistance but still retaining significant flexibility of movement for the wearer. The first unit 6 is intended to be worn adjacent to the wearer's body and the second unit 7 facing towards the projectile. The FIG. 2(b) also illustrates an alternative criss-cross stitch pattern 12.

The bag of feathers may also be replaced or supplemented by a layer or layers of felt or foam material.

I claim:

1. Flexible protective armour comprising:
    (a) a front armour portion comprising one or more layers of a first woven aramid fibre,
    (b) a back trauma attenuation portion comprising a layer of a material selected from foam, felt or feathers adjacent to one or more layers of a second woven aramid fibre, said front armour portion and said back trauma attenuation portion being placed together so as to sandwich said layer of material selected from foam, felt or feathers between said first and second woven aramid fibres, and (c) means drawing said front armour portion and said back trauma attenuation portion tightly together to form an integral structure.

2. Flexible protective armour according to claim 1 comprising a further separate flexible protective armour in front of the laminate, the further armour comprising one or more layers of an aramid fibre fabric.

3. Flexible protective armour according to claim 1 which has been treated to render it water proof.

4. Flexible protective armour according to claim 1 in which the laminate has a surrounding cover.

5. Flexible protective armour according to claim 1 in which the layers are drawn tightly together by stitching.

6. Flexible protective armour according to claim 5 which is stitched so as to contour the armour to fit closely against the body.

* * * * *